(12) United States Patent
Stevens et al.

(10) Patent No.: US 7,243,946 B2
(45) Date of Patent: Jul. 17, 2007

(54) PEROXIDE LINEAR INFLATOR

(75) Inventors: Bruce A. Stevens, Oakland, MI (US); Graylon K. Williams, Warren, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 158 days.

(21) Appl. No.: 10/991,232

(22) Filed: Nov. 17, 2004

(65) Prior Publication Data
US 2005/0104349 A1    May 19, 2005

Related U.S. Application Data

(60) Provisional application No. 60/520,956, filed on Nov. 18, 2003.

(51) Int. Cl.
*B60R 21/26* (2006.01)
(52) U.S. Cl. .................. 280/741; 280/737; 102/530
(58) Field of Classification Search ............. 280/737, 280/741, 736, 742; 102/530, 531; 222/3, 222/5
See application file for complete search history.

(56) References Cited

U.S. PATENT DOCUMENTS

| | | | |
|---|---|---|---|
| 3,397,639 A | 8/1968 | Alderfer | |
| 3,606,377 A | 9/1971 | Martin | |
| 3,721,456 A | 3/1973 | McDonald | |
| 3,733,088 A | 5/1973 | Stephenson | |
| 3,785,674 A * | 1/1974 | Poole et al. | 280/741 |
| 3,799,573 A | 3/1974 | Olsson et al. | |
| 3,897,961 A | 8/1975 | Leising et al. | |
| 3,904,221 A | 9/1975 | Shiki et al. | |
| 3,929,074 A | 12/1975 | San Miguel | |
| 3,986,808 A | 10/1976 | Keith | |
| 4,005,876 A | 2/1977 | Jorgensen et al. | |
| 4,012,211 A | 3/1977 | Goetz | |
| 4,200,615 A | 4/1980 | Hamilton et al. | |
| 4,322,385 A | 3/1982 | Goetz et al. | |
| 4,358,998 A | 11/1982 | Schneiter et al. | |
| 4,561,675 A * | 12/1985 | Adams et al. | 280/734 |
| 4,781,645 A * | 11/1988 | Kato | 446/188 |
| 4,846,368 A | 7/1989 | Goetz | |
| 4,878,690 A | 11/1989 | Cunningham | |

(Continued)

OTHER PUBLICATIONS

U.S. Appl. No. 11/191,291, Khandhadia et al.

*Primary Examiner*—Paul N. Dickson
*Assistant Examiner*—Drew J. Brown
(74) *Attorney, Agent, or Firm*—L.C. Begin & Associates, PLLC (57) ABSTRACT

An inflator includes a housing and a gas source material enclosed in a rupturable container in the housing. The gas source material is adapted to undergo decomposition to form an inflation gas. A reactant material is adapted to react with the gas source material to produce decomposition thereof, and is positioned in a cavity extending between a housing outer wall and an enclosure positioned within the housing. The container and an expandable bladder are positioned in the enclosure. Ignition of a propellant within the bladder generates combustion gases, thereby expanding the bladder. Bladder expansion forces portions of the container into openings formed along the enclosure, thereby stressing and rupturing the portions of the container in the openings and releasing gas source material to flow through the openings into the cavity, where it reacts with the catalyst to produce inflation gas.

47 Claims, 5 Drawing Sheets

U.S. PATENT DOCUMENTS

| | | | |
|---|---|---|---|
| 4,890,860 A | 1/1990 | Schneiter | |
| 4,950,458 A | 8/1990 | Cunningham | |
| 5,060,973 A * | 10/1991 | Giovanetti | 280/736 |
| 5,094,475 A | 3/1992 | Olsson et al. | |
| 5,101,730 A | 4/1992 | Bender et al. | 102/288 |
| 5,109,772 A | 5/1992 | Cunningham et al. | |
| 5,139,588 A | 8/1992 | Poole | |
| 5,211,224 A | 5/1993 | Bouldin | 166/63 |
| 5,308,370 A | 5/1994 | Kraft et al. | |
| 5,322,322 A | 6/1994 | Bark et al. | |
| 5,324,071 A | 6/1994 | Gotomyo et al. | 280/730.1 |
| 5,345,873 A | 9/1994 | Lauritzen et al. | 102/290 |
| 5,368,329 A | 11/1994 | Hock | 280/741 |
| 5,409,259 A | 4/1995 | Cunningham et al. | |
| 5,439,250 A | 8/1995 | Kokeguchi et al. | |
| 5,443,286 A | 8/1995 | Cunningham et al. | |
| 5,462,308 A | 10/1995 | Seki et al. | |
| 5,464,249 A | 11/1995 | Lauritzen et al. | |
| 5,482,315 A | 1/1996 | Chandler et al. | 280/741 |
| 5,503,079 A | 4/1996 | Kishi et al. | |
| 5,503,428 A | 4/1996 | Awotwi et al. | 280/730.2 |
| 5,503,806 A | 4/1996 | Fulmer et al. | 422/164 |
| 5,540,154 A | 7/1996 | Wilcox et al. | |
| 5,540,459 A | 7/1996 | Daniel | |
| 5,542,704 A | 8/1996 | Hamilton et al. | |
| 5,547,638 A | 8/1996 | Rink et al. | |
| 5,551,343 A | 9/1996 | Hock et al. | 102/288 |
| 5,562,303 A | 10/1996 | Schleicher et al. | |
| 5,573,271 A | 11/1996 | Headly | |
| 5,578,787 A | 11/1996 | Kobari et al. | 102/288 |
| 5,588,670 A | 12/1996 | Storey et al. | 280/730.2 |
| 5,588,672 A | 12/1996 | Karlow et al. | |
| 5,607,181 A * | 3/1997 | Richardson et al. | 280/737 |
| 5,615,914 A | 4/1997 | Galbraith et al. | 280/743.1 |
| 5,623,115 A | 4/1997 | Lauritzen et al. | |
| 5,626,360 A | 5/1997 | Lauritzen et al. | |
| 5,635,665 A | 6/1997 | Kishi et al. | |
| 5,735,572 A | 4/1998 | Clark et al. | 297/216.13 |
| 5,743,556 A | 4/1998 | Lindsay et al. | |
| 5,752,715 A | 5/1998 | Pripps et al. | 280/740 |
| 5,779,263 A | 7/1998 | Lane et al. | 280/730.2 |
| 5,826,904 A | 10/1998 | Ellis et al. | 280/737 |
| 5,827,996 A | 10/1998 | Yoshida et al. | |
| 5,845,933 A | 12/1998 | Walker et al. | |
| 5,868,424 A | 2/1999 | Hamilton et al. | |
| 5,871,228 A | 2/1999 | Lindsay et al. | |
| 5,908,204 A | 6/1999 | Smith | 280/741 |
| 5,941,563 A | 8/1999 | Schoenborn | 280/740 |
| 5,941,752 A * | 8/1999 | Liebermann | 446/220 |
| 5,967,550 A | 10/1999 | Shirk et al. | |
| 6,019,861 A | 2/2000 | Canterberry et al. | |
| 6,029,994 A | 2/2000 | Perotto et al. | |
| 6,032,979 A | 3/2000 | Mossi et al. | |
| 6,039,820 A | 3/2000 | Hinshaw et al. | |
| 6,051,158 A | 4/2000 | Taylor et al. | |
| 6,053,110 A | 4/2000 | Marchant et al. | 102/288 |
| 6,056,319 A | 5/2000 | Ruckdeschel et al. | |
| 6,062,143 A | 5/2000 | Grace et al. | |
| 6,077,371 A | 6/2000 | Lundstrom et al. | |
| 6,129,023 A | 10/2000 | Marsaud et al. | 102/288 |
| 6,142,518 A | 11/2000 | Butt et al. | |
| 6,145,876 A | 11/2000 | Hamilton | |
| 6,170,867 B1 | 1/2001 | Rink et al. | |
| 6,176,517 B1 | 1/2001 | Hamilton et al. | |
| 6,177,028 B1 | 1/2001 | Kanda et al. | |
| 6,315,847 B1 | 11/2001 | Lee et al. | |
| 6,336,651 B1 | 1/2002 | Mramor et al. | 280/728.2 |
| 6,347,566 B1 | 2/2002 | Rabotinsky et al. | |
| 6,382,661 B1 | 5/2002 | Sutherland | 280/728.2 |
| 6,412,816 B1 | 7/2002 | Gast et al. | 280/736 |
| 6,416,599 B1 | 7/2002 | Yoshikawa et al. | |
| 6,425,601 B1 | 7/2002 | Lewis | 280/728.2 |
| 6,497,429 B1 | 12/2002 | Matsumoto | |
| 6,502,513 B1 | 1/2003 | Barnes et al. | 102/288 |
| 6,595,546 B2 | 7/2003 | Smith | 280/736 |
| 6,595,547 B2 | 7/2003 | Smith | |
| 6,601,871 B2 | 8/2003 | Fischer | |
| 6,688,231 B1 | 2/2004 | Herrmann | |
| 6,752,421 B2 | 6/2004 | Khandhadia et al. | |
| 6,755,438 B2 | 6/2004 | Rink et al. | |
| 6,805,377 B2 | 10/2004 | Krupp et al. | |
| 6,846,013 B2 | 1/2005 | Smith | |
| 6,846,014 B2 | 1/2005 | Rink et al. | 280/740 |
| 6,942,261 B2 | 9/2005 | Larsen et al. | 293/107 |
| 7,025,164 B2 | 4/2006 | Takimoto | 180/274 |
| 7,052,041 B2 * | 5/2006 | McCormick | 280/741 |
| 2002/0038948 A1 * | 4/2002 | Yamamori et al. | 280/736 |
| 2003/0173761 A1 | 9/2003 | Rink et al. | 280/736 |
| 2003/0178828 A1 * | 9/2003 | Rink et al. | 280/741 |
| 2003/0197354 A1 | 10/2003 | Beland et al. | 280/730.1 |
| 2004/0061316 A1 | 4/2004 | Elgadah et al. | 280/730.2 |
| 2004/0084885 A1 | 5/2004 | Burns et al. | |
| 2005/0116454 A1 | 6/2005 | Stevens | |
| 2005/0151358 A1 | 7/2005 | Burns | |
| 2005/0200103 A1 | 9/2005 | Burns et al. | |
| 2005/0218637 A1 | 10/2005 | Burns | |
| 2005/0218638 A1 | 10/2005 | Burns et al. | |
| 2006/0022444 A1 | 2/2006 | Khandhadia | |
| 2006/0138763 A1 | 6/2006 | Brady | 280/756 |

* cited by examiner

PEROXIDE LINEAR INFLATOR

CROSS-REFERENCE TO RELATED APPLICATION

This application is entitled to and claims the benefit of Provisional Patent Application Ser. No. 60/520,956 filed on Nov. 18, 2003.

BACKGROUND OF THE INVENTION

The present invention relates generally to vehicle occupant protection systems, and more particularly to inflators employed in vehicle occupant protection systems incorporating inflatable protection devices.

It is well known to protect a vehicle occupant using an inflatable cushion, or airbag, which is inflated with gas when the vehicle encounters sudden deceleration, such as in a collision. In such systems, the airbag cushion is normally housed in an uninflated and folded condition to minimize space requirements. Upon actuation of the system, the airbag is inflated, in a matter of no more than a few milliseconds, with gas produced or supplied by a device commonly referred to as an inflator.

Many types of inflator devices have been disclosed in the art for the inflating of one or more inflatable restraint system airbag cushions. Prior art airbag systems utilize compressed stored gas inflators, pyrotechnic inflators and hybrid inflators. However, each of these types of inflators has been subject to certain disadvantages, such as greater than desired weight and space requirements, production of undesired or non-preferred combustion products in greater than desired amounts, and production or emission of gases at a greater than desired temperature. Thus, there is a continuing need and demand for further improvements in safety, simplicity, effectiveness, economy of size, and reliability in the apparatus and techniques used for inflating an inflatable device such as an airbag cushion.

SUMMARY OF THE INVENTION

The present invention provides an inflator comprising a housing having an interior and a plurality of gas exit orifices formed across its length. A liquid or thixotropic gas source material is positioned in the housing interior and is enclosed in a pliable, rupturable substantially gas-and-moisture-impermeable container. The gas source is a material (for example, hydrogen peroxide) adapted to undergo decomposition to form at least one gaseous decomposition product comprising an inflation gas. A reactant material is also positioned in the interior of the housing. The reactant material is a material (such as a catalyst) formulated to react with the gas source material to produce decomposition of the gas source material. An enclosure is positioned within the housing to form a cavity between an inner wall of the housing and the enclosure. The reactant material is positioned in the cavity. A plurality of orifices formed through the enclosure enables fluid communication between the interior of the enclosure and the cavity. The container is positioned in the enclosure. A resilient, expandable bladder is also positioned in the enclosure. A propellant is provided within the bladder for generation of combustion gases upon ignition of the propellant, to produce expansion of the bladder. An ignition source is provided for igniting the propellant. Upon ignition of the propellant, combustion gases expand the bladder which forces a portion of the container into the enclosure orifices, thereby stressing and rupturing the portions of the container in the orifices and releasing the hydrogen peroxide to flow through the orifice into the cavity, where it reacts with the catalyst to produce inflation gas. The inflator described herein provides a reliable, compact, inexpensively produced, and easily assembled source of non-toxic inflation gas for inflating elements of an inflatable vehicle occupant restraint system.

DETAILED DESCRIPTION

Figures 1, 2:
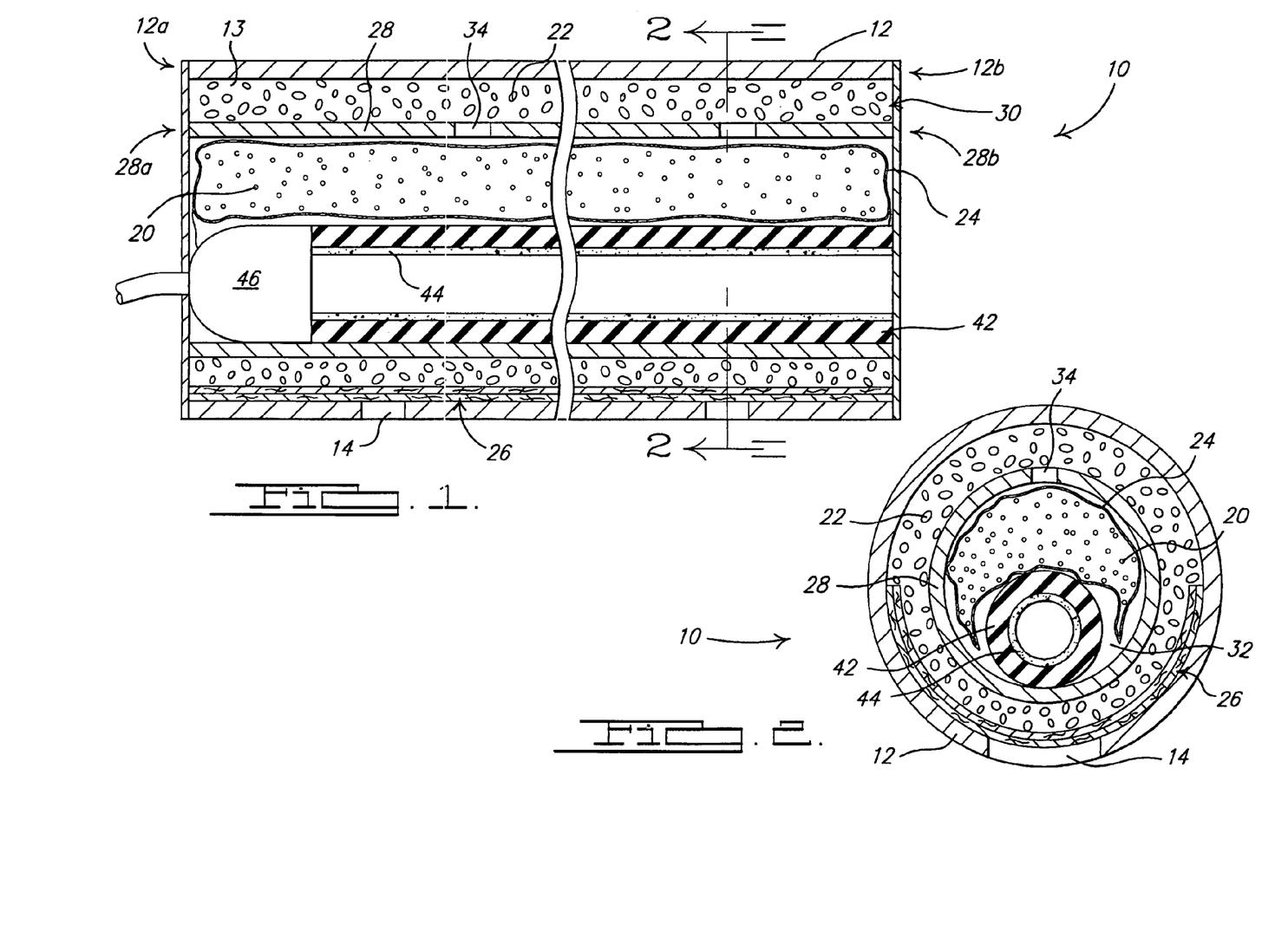
FIG. 1 is a cross-sectional side view of the interior of an inflator in accordance with an embodiment of the present invention.
FIG. 2 is a cross-sectional end view of the inflator of FIG. 1.

As shown in FIGS. 1 and 2, inflator 10 includes an elongate, substantially cylindrical housing 12 defining a first end 12a, a second end 12b, and an interior 13. A plurality of orifices 14 are longitudinally spaced along the housing to enable fluid communication between the interior of the housing and an exterior of the housing, wherein the housing 12 fluidly communicates with an airbag or inflatable cushion 15, for example. Orifices 14 may vary in number or design from those shown in FIGS. 1 and 2. Housing 12 may be roll formed from sheet metal and then perforated. A screen or filter 26, formed as is known in the art from a wire or carbon graphite mesh, for example, may be disposed intermediate the interior of the housing and the plurality of housing orifices for filtering the inflation gas, and/or retaining the reactant material inside housing 12.

An amount of a gas source material 20 is positioned in the interior of housing 12. Gas source material 20 is formulated to undergo decomposition to form decomposition products upon reaction with a reactant composition. The decomposition products include at least one gaseous decomposition product for use as an inflation gas. In the embodiment shown, gas source material 20 is an amount of liquid hydrogen peroxide in a molar quantity sufficient to generate effective amounts of water vapor and oxygen upon contact with a catalyst. Stated another way, the hydrogen peroxide is provided in amounts that will inflate an airbag at the desired rate of inflation upon contact with the catalyst. This may be determined on an iterative basis depending on the applicable protective system.

An amount of a reactant material 22 is also positioned in interior 13 of housing 12 in fluid isolation from gas source material 20. Reactant material 22 is adapted to react with the gas source material to produce decomposition of the gas source material, resulting in the generation of inflation gases. In the embodiment shown, reactant material 22 comprises a catalyst formulated to react with the hydrogen peroxide. The catalyst may be selected from Carulite® (Manganese dioxide and cupric oxide) made by Carus Chemical Co.; silver; manganate; potassium permanganate; potassium permanganate and alumina beads; and mixtures thereof, for example. Other useful known catalysts may also be employed whereby the catalyst is chosen to be reactive with the respective gas generating material housed within the container, thereby liberating gaseous products.

Refining again to FIGS. 1 and 2, in order to fluidly isolate reactant material 22 from gas source material 20, gas source material 20 is enclosed in a pliable, rupturable, substantially gas-and-moisture-impermeable container 24. The reactant material is then positioned to communicate with the gas generant material 20 within rupturable container 24, upon rupture thereof. In the embodiment shown, the container comprises a bag formed from a polyester film, a Mylar® compound for example. Also in the embodiment shown, the container is substantially coextensive with housing 22 and gas source material 20 is enclosed in container 24, with reactant material 22 positioned in interior 13 of housing 12. In an alternative embodiment, the reactant material is enclosed in rupturable container 24, and gas source material 20 is positioned within the housing interior so as to communicate with the reactant material upon rupture of the container.

In accordance with the present invention, a mechanism is provided for producing rupture of container 24 to enable fluid communication between gas source material 20 and reactant material 22, thereby enabling reaction between the gas source material and the reactant to generate inflation gas. In the embodiment of the invention shown in FIGS. 1 and 2, the mechanism for producing rupture of the container includes an enclosure 28 and a resilient, expandable bladder 42 positioned in the enclosure.

As seen in FIGS. 1 and 2, enclosure 28 has an elongate, substantially cylindrical structure and is positioned within housing 12 to form a cavity 30 between an outer wall of housing 12 and the enclosure. Enclosure 28 has a first end 28a, a second end 28b, and an interior 32. A plurality of orifices 34 is formed along the enclosure to enable fluid communication between the interior of the enclosure and cavity 30. Enclosure 28 is substantially coextensive with housing 12. Orifices 34 may vary in number or design from those shown in FIGS. 1 and 2. Enclosure 28 may be roll formed from a sheet metal, such as carbon steel or aluminum, and then perforated. As seen in FIGS. 1 and 2, in this embodiment of the present invention container 24 is positioned in the interior of enclosure 28. Other enclosure and housing materials such as porous fabrics, composites, foils or films are contemplated.

A bladder 42 is positioned in the interior of enclosure 28 and is substantially coextensive with housing 12. Bladder 42 may be in contact with container 24, or the bladder 42 may be partially or completely spaced apart from the container 24 prior to activation of the inflator 10. However, bladder 42 is positioned in communication with container 24 such that, upon expansion, the bladder 42 contacts the container 24 to force a portion of the container 24 into at least one (but preferably more than one) of enclosure orifices 34. Forcing of a portion of the container into orifices 34 causes stressing and rupturing of the portion of the container in the orifice, thereby releasing the contents of container 24 to flow through the rupture into cavity 30. Bladder 42 may be extruded from a rubber compound or some other suitably elastic material.

To produce expansion of bladder 42, a propellant 44 is extruded or otherwise provided within the bladder for generation of combustion gases upon ignition of the propellant. Propellant 44 generally extends along a length of bladder 42. In one embodiment, propellant 44 comprises silicone as a fuel at about 10-25% by weight, and a perchlorate oxidizer such as ammonium, lithium, or potassium perchlorate making up the remainder. The silicone may be purchased, for example, from General Electric or other well-known suppliers. Silicone provides the additional benefit of acting as a binder, facilitating the extrusion of propellant strips or ribbons, as described herein. The other propellant constituents may be provided by suppliers or by manufacturing methods well known in the art. Exemplary suitable compositions are disclosed in co-owned U.S. Pat. No. 6,805,377, herein incorporated by reference. In a preferred embodiment, bladder 42 may be coated with the propellant composition on an inner wall along the length thereof.

An ignition source 46 is also provided for igniting propellant 44. Ignition source 46 ignitably communicates with propellant 44 and may be activated by a crash sensor upon a crash event, for example. Ignition source may comprise, for example, an electric match pyrotechnic product, such as manufactured by Daveyfire Inc. of Sacramento, Calif. USA and as is well known in the art. While such electric matches provide a relatively inexpensive means of ignition, it will be understood that numerous other ignition systems could be used with the same effectiveness. Other typical igniters known in the art are also contemplated.

Other methods may be used to produce expansion of bladder 42. For example, expansion of bladder 42 may be produced by a flow of a fluid, such as a compressed gas, from a compressed fluid source (not shown) into bladder 42. The compressed gas source provides an expandable fluid to bladder 42 to expand the bladder upon activation of the inflator.

Figure 2A:
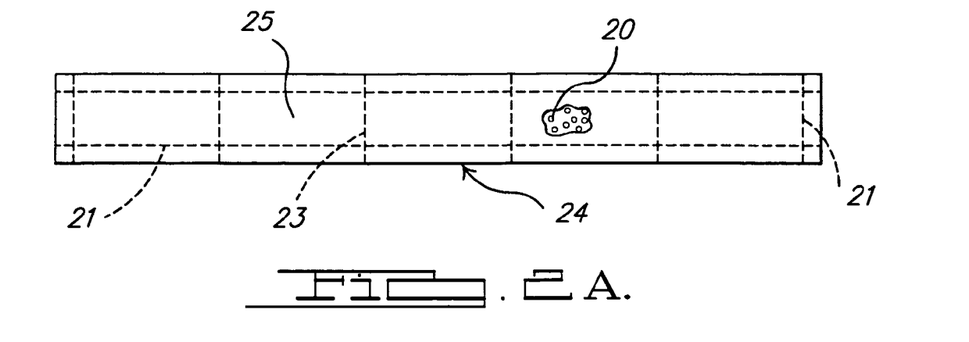
FIG. 2A shows a plan view of one embodiment of a gas source container in accordance with the present invention.
Figure 2B:
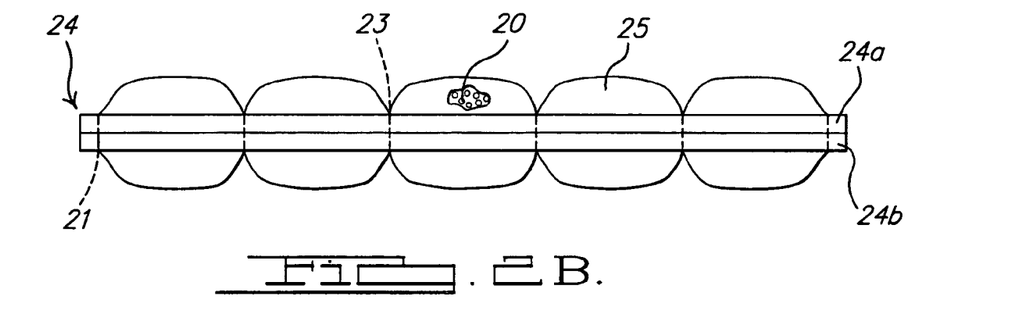
FIG. 2B shows a side view of the embodiment of the gas source container shown in FIG. 2A.

Referring to FIGS. 2A and 2B, a first embodiment of container 24 includes two layers 24a, 24b of film joined along portions thereof (for example, by heat sealing) to provide seams 21 defining one or more hermetically sealed compartments 25 between the layers. In a particular embodiment, each compartment 25 has a substantially equal amount of gas source material 20 provided therein. This facilitates positioning of gas source material 20 substantially uniformly along the extent of inflator 10.

Figure 2C:
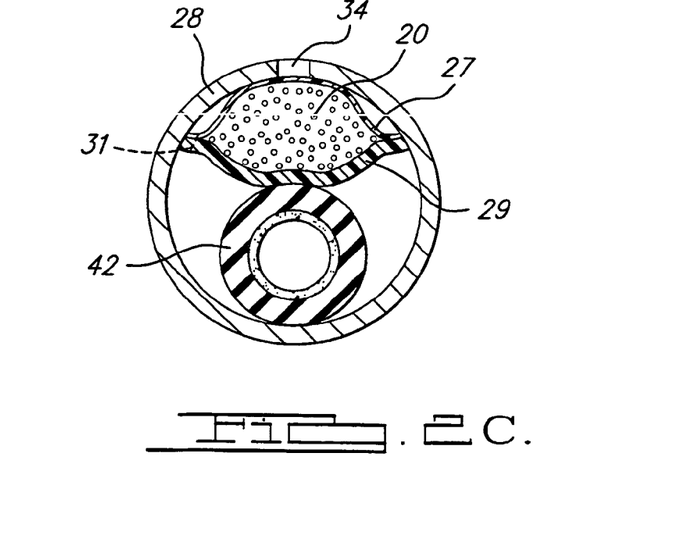
FIG. 2C is a cross-sectional end view of a bladder and another embodiment gas source container positioned in an enclosure in accordance with the present invention.

Referring to FIG. 2C, a second embodiment of container 24 includes a film layer 27 in contact with the inside surface of enclosure 28, and a film layer 29, in contact with bladder 42. Film layers 27 and 29 are joined along portions thereof (for example, by heat sealing) to produce one or more hermetically sealed compartments between the layers. Film layers 27 and 29 are designed so that a first predetermined ultimate load F1 is required to produce rupture of film layer 27 and a second predetermined ultimate load F2 is required to produce rupture of layer 29, where second ultimate load F2 is greater than first ultimate load F1. As used herein, the term "ultimate strength" is understood to signify the force necessary to cause rupture of the material.

In one particular embodiment (shown in FIG. 2C), layer 27 is formed from the same material as layer 29, but layer 29 is thicker (and, therefore, has greater strength) than layer 27. The thickness (and strength) of film layer 27 is such that, when bladder 42 is inflated, the pressure generated inside container 24 is sufficient to rupture film layer 27 at orifices 34 of enclosure 28. The thickness (and strength) of film layer 29 is such that, when bladder 42 is inflated, the pressure generated against film layer 29 at orifices 34 is insufficient to rupture film layer 29 at orifices 34.

In another particular embodiment (not shown), layer 27 is formed from a different material (having a different strength) than layer 29. Ultimate load F1 of layer 27 is such that, when bladder 42 is inflated, the pressure generated inside container 24 is sufficient to cause the load in layer 27 in orifices 42 to exceed ultimate load F1, thereby rupturing film layer 27 at orifices 34. Ultimate load F2 of film layer 29 is such that, when bladder 42 is inflated, the pressure generated against film layer 29 is insufficient to cause the forces in layer 29 in orifices 34 to meet or exceed ultimate load F2. Thus, layer 29 will not rupture when bladder 42 forces layer 29 into orifices 42.

In the manner described above, layer 29 is provided with a strength sufficient to prevent rupture of the layer if bladder 42 forces layer 29 against orifices 34. Thus, a film layer 29 that is not rupturable due to inflation of bladder 42 is interposed between the bladder and orifices 24. This helps prevent rupture of bladder 42 at orifices 34 after rupture of film layer 27.

Figure 3:
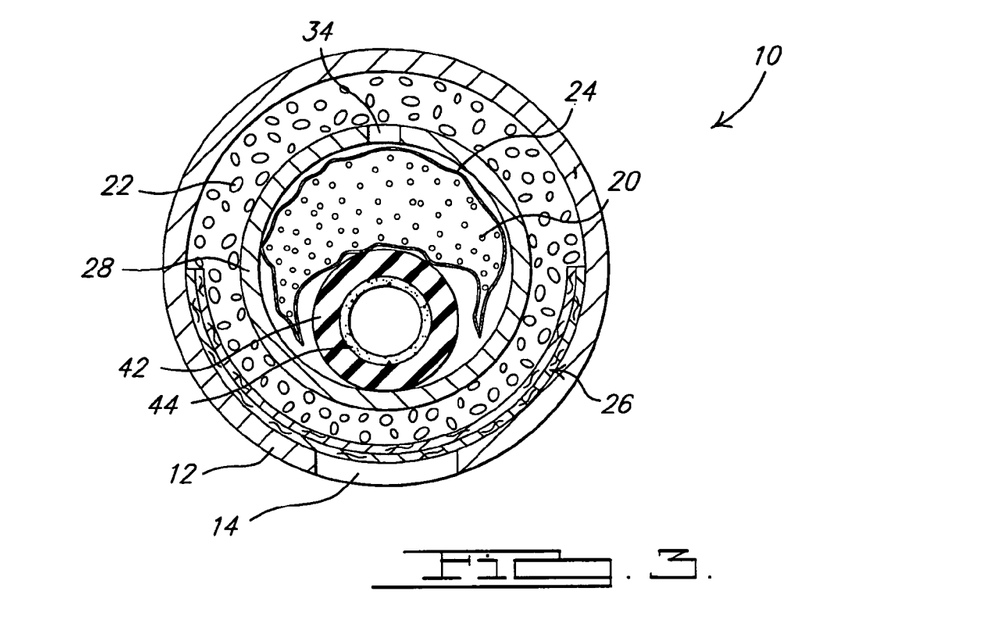
FIG. 3 is the cross-sectional end view of FIG. 2 showing the inflator in a pre-activation state.
Figure 4:
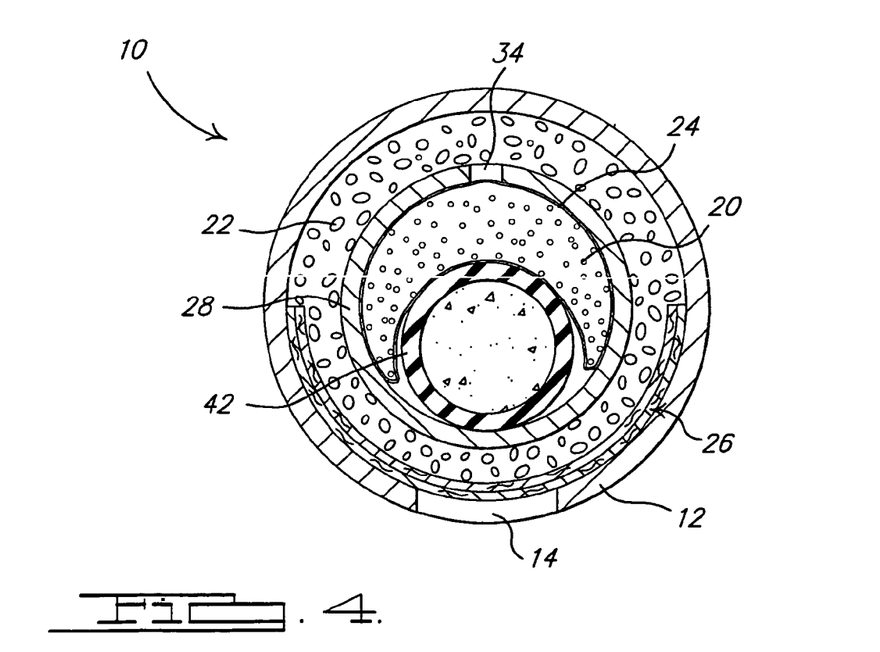
FIG. 4 is the cross-sectional end view of FIG. 3 showing the initial stage of expansion of the inflator bladder.
Figure 5:
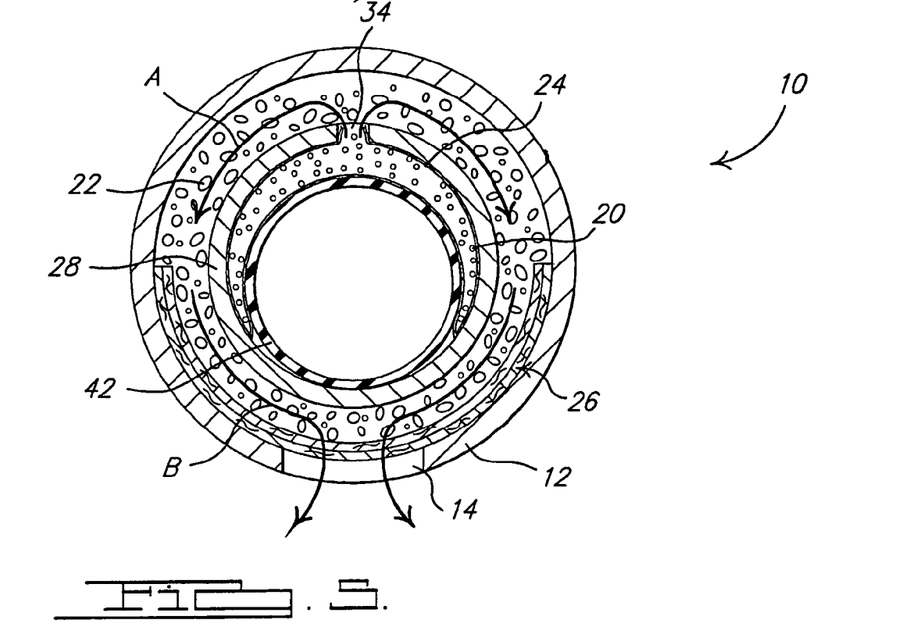
FIG. 5 is cross-sectional end view of FIG. 4 showing rupture of the container and flow of the catalyst into the housing chamber.
Figure 6:
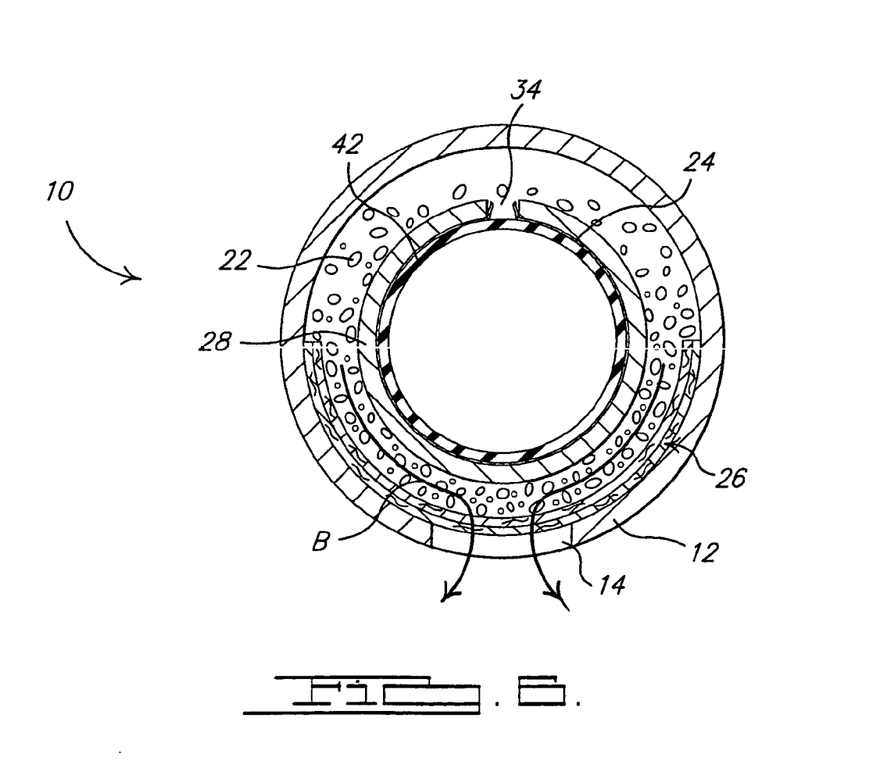
FIG. 6 is the cross-sectional end view of FIG. 5 showing inflation gas flow out of the housing upon reaction between the peroxide and the catalyst.

Referring to FIGS. 3-6, operation of inflator 10 will now be discussed. FIG. 3 shows inflator 10 in a pre-activation state. Referring to FIG. 4, propellant 44 is ignited and burns upon receipt by electric match 46 of a signal from a crash sensor algorithm (not shown). Propellant 44 inside bladder 42 rapidly ignites, the resultant combustion propagating rapidly down the length of the bladder and generating pressure from expanding combustion gases to expand bladder 42. As bladder 42 expands, container 24 is forced into contact with inner wall of housing 28, placing the gas source material 20 under pressure, thereby stressing and rupturing container 24 in the orifice area (FIG. 5). Hydrogen peroxide 20 stored in container 24 is thereby released from the container to flow through enclosure orifices 34 along the directions indicated by arrows A and into cavity 30 and react with catalyst 22. Upon reacting with the catalyst, the hydrogen peroxide undergoes decomposition to form water vapor and oxygen. The reaction gases are then routed along the directions indicated by arrows B, through the filter and out of housing gas exit orifices 14 (FIG. 6), and into an inflatable cushion or airbag (not shown).

Figure 7:
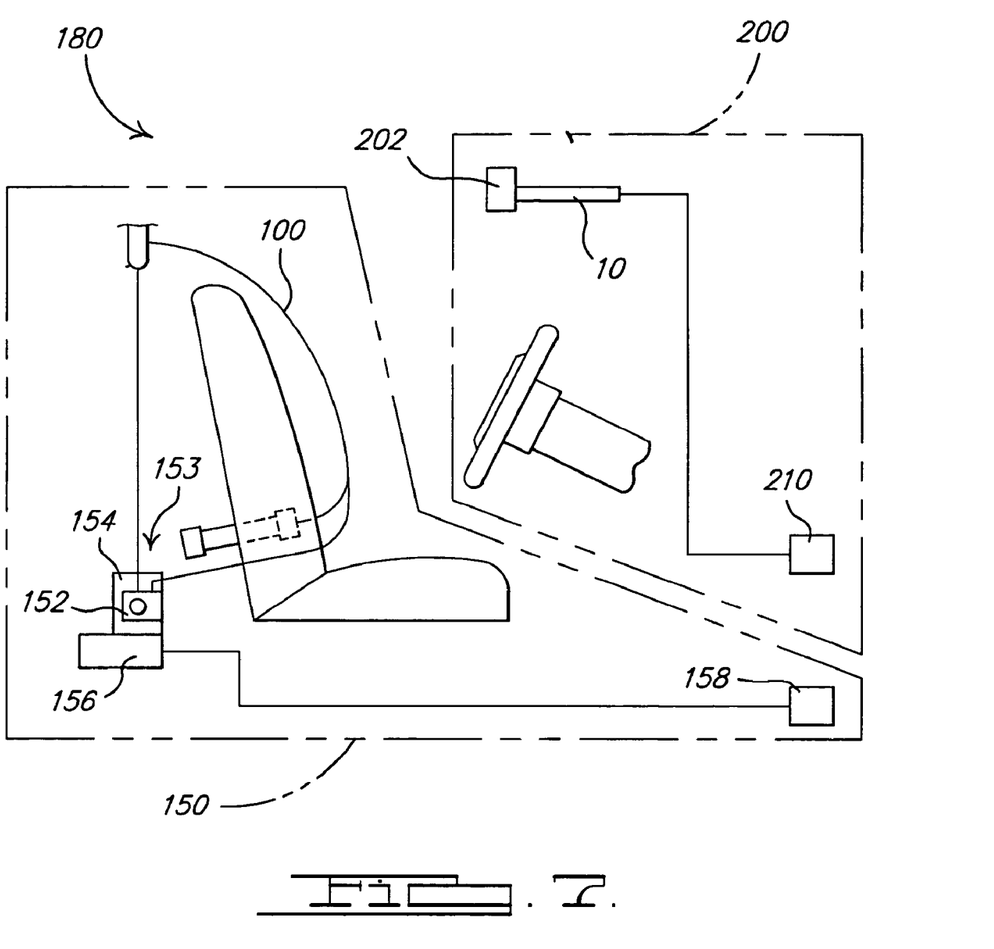
FIG. 7 is a schematic representation of an exemplary vehicle occupant restraint system incorporating an inflator in accordance with the present invention.

A linear inflator as described herein may be incorporated into an airbag system 200. FIG. 7 shows a schematic diagram of one exemplary embodiment of such a system. The inflator is particularly useful, although not thereby limited, within a side impact, head curtain, or pedestrian protection airbag module. Airbag system 200 includes at least one airbag 202 and an inflator 10 as described herein coupled to airbag 202 so as to enable fluid communication with an interior of the airbag. As known in the art, airbag device or system 200 may communicate with a crash event sensor 210 by way of a crash sensor algorithm that actuates airbag system 200 via activation of airbag inflator 10 in the event of a collision.

Referring again to FIG. 7, airbag system or device 200 may also be incorporated into a broader, more comprehensive vehicle occupant restraint system 180 including additional elements such as a safety belt assembly 150. Safety belt assembly 150 includes a safety belt housing 152 and a safety belt 100 extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667, 161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

The present description is for illustrative purposes only, and should not be construed to narrow the breadth of the present invention in any fashion. Thus, the various structural and operational features herein disclosed are susceptible to a number of modifications, none of which departs from the scope of the present invention as defined in the appended claims. For example: the bladder inflation rate may be controlled by propellant characteristics and amount; the pressure within the inner tube may be controlled by propellant characteristics and amount; the size and quantity of the inner tube perforations may be adjusted to tailor the hydrogen peroxide flow rate over the catalyst; and catalyst characteristics such as material, particle size, and particle surface characteristics including porosity may be used to control the decomposition of the hydrogen peroxide. Other aspects, features and advantages will be apparent upon an examination of the attached drawing figures.

The invention claimed is:

1. An inflator comprising:

a housing having an interior and a plurality of orifices formed therealong to enable fluid communication between the interior of the housing and an exterior of the housing;

an amount of a gas source material positioned in the interior of the housing, the gas source material being formulated to undergo decomposition to form decomposition products including at least one gaseous decomposition product comprising an inflation gas;

an amount of a reactant material positioned in the interior of the housing in fluid isolation from the gas source material, the reactant material being selected to react with the gas source material to produce decomposition of the gas source material including the at least one gaseous decomposition product, one of the gas source material and the reactant material being contained in a substantially rupturable container; and a mechanism for producing rupture of the container to enable fluid communication between the gas source material and the reactant material; and an enclosure positioned within the housing to form a cavity between an outer wall of the housing and the enclosure, the enclosure having an interior and a plurality of orifices formed therealong to enable fluid communication between the interior of the enclosure and the interior of the housing, and wherein the container is positioned in the interior of the enclosure;

wherein the mechanism for producing rupture of the container forces a portion of the container into at least one orifice of the plurality of enclosure orifices, thereby stressing and rupturing the portion of the container in the at least one orifice and releasing contents of the container to flow through the orifice into the cavity.

2. The inflator of claim 1 wherein the gas source material comprises liquid hydrogen peroxide.

3. The inflator of claim 2 wherein the reactant material comprises a catalyst selected from the group consisting of manganate and cupric oxide; silver; manganate; potassium permanganate; potassium permanganate and alumina beads; and mixtures thereof.

4. The inflator of claim 1 wherein a filter is positioned intermediate the interior of the housing and the plurality of housing orifices for filtering the inflation gas.

5. The inflator of claim 1 wherein the enclosure is formed from a porous material.

6. The inflator of claim 1 wherein the enclosure is substantially coextensive with the housing.

7. The inflator of claim 1 wherein the mechanism for producing rupture of the container includes a resilient, expandable bladder positioned in the interior of the enclosure in communication with the container such that, upon expansion, the bladder contacts the container to force a portion of the container into the at least one orifice of the plurality of enclosure orifices, thereby stressing and rupturing the portion of the container in the at least one orifice.

8. The inflator of claim 7 wherein the mechanism for producing rupture of the container further comprises a propellant provided within the bladder for generation of combustion gases upon ignition of the propellant, to produce expansion of the bladder, and an ignition source for igniting the propellant.

9. The inflator of claim 8 wherein the propellant comprises a compound of silicone and potassium perchlorate.

10. The inflator of claim 9 wherein the propellant comprises silicone as a fuel in a concentration of about 10-25% by weight; a perchlorate oxidizer such as ammonium, lithium, or potassium perchlorate; and a strontium salt such as strontium nitrate or strontium carbonate as a coolant.

11. The inflator of claim 7 wherein the ignition source comprises an electric match.

12. The inflator of claim 7 wherein the bladder is substantially coextensive with the housing.

13. The inflator of claim 7 wherein the bladder is formed from a rubber compound.

14. The inflator of claim 7 wherein the mechanism for producing rupture of the container further comprises a compressed fluid source for providing an expandable fluid to the bladder to expand the bladder upon activation of the inflator.

15. The inflator of claim 7 wherein an interior wall of the bladder is coated with propellant.

16. The inflator of claim 1 wherein the container comprises a bag formed from a polyester film.

17. The inflator of claim 1 wherein the gas source material is enclosed in the container.

18. The inflator of claim 1 wherein the reactant material is enclosed in the container.

19. The inflator of claim 1 wherein the container is substantially coextensive with the housing.

20. The inflator of claim 1 wherein the housing is formed from a porous material.

21. An inflator comprising:
a housing having an interior and a plurality of orifices formed therealong to enable fluid communication between the interior of the housing and an exterior of the housing;
an amount of a gas source material positioned in the interior of the housing, the gas source material being formulated to undergo decomposition to form decomposition products including at least one gaseous decomposition product comprising an inflation gas;
an amount of a reactant material positioned in the interior of the housing in fluid isolation from the gas source material, the reactant material being selected to react with the gas source material to produce decomposition of the gas source material including the at least one gaseous decomposition product, one of the gas source material and the reactant material being contained in a substantially rupturable container; and
a mechanism for producing rupture of the container to enable fluid communication between the gas source material and the reactant material,
wherein the container comprises a first layer and a second layer joined to the first layer along at least one seam to provide at least one hermetically sealed compartment between the layers.

22. The inflator of claim 21 wherein the second layer is joined to the first layer along a plurality of intersecting seams to provide a plurality of hermetically sealed compartments between the layers.

23. The inflator of claim 22 wherein each compartment of the plurality of compartments has a substantially equal amount of gas source material contained therein.

24. The Inflator of claim 21 wherein a first ultimate load is required to produce rupture of the first layer and a second ultimate load is required to produce rupture of the second layer, and wherein the second ultimate load is greater than the first ultimate load.

25. The inflator of claim 21 wherein the first layer has a first thickness and the second layer has a second thickness, and wherein the second thickness is greater tan the fist thickness.

26. The inflator of claim 21 wherein the first layer and the second layer are formed from different materials.

27. An airbag system comprising:
at least one airbag; and
an inflator including:
a housing having an interior and a plurality of orifices formed therealong to enable fluid communication between an interior of the housing and an exterior of the housing;
an amount of a gas source material positioned in the interior of the housing, the gas source material being adapted to undergo decomposition to form decomposition products including at least one gaseous decomposition product comprising an inflation gas;
an amount of a reactant material positioned in the interior of the housing in fluid isolation from the gas source material, the reactant material being adapted to react with the gas source material to produce decomposition of the gas source material including the at least one gaseous decomposition product, a first one of the gas source material and the reactant material being enclosed in a rupturable container, the other one of the gas source material and the reactant material being positioned to communicate with the first one of the gas source material and the reactant material upon rupture of the rupturable container; and a mechanism for producing rupture of the container to enable fluid communication between the gas source material and the reactant material;

wherein the mechanism for producing rupture of the container forces a portion of the container into at least one orifice of the plurality of enclosure orifices, thereby stressing and rupturing the portion of the container in the at least one orifice and releasing contents of the container to flow through the orifice into the interior of the housing.

28. The inflator of claim 27 further comprising an enclosure positioned within the housing to form a cavity between an outer wall of the housing and the enclosure, the enclosure having an interior and a plurality of orifices formed therealong to enable fluid communication between the interior of the enclosure and the interior of the housing, and wherein the container is positioned in the interior of the enclosure.

29. The inflator of claim 27 wherein the mechanism for producing rupture of the container includes a resilient, expandable bladder positioned in the interior of the enclosure in communication with the container such that, upon expansion, the bladder contacts the container to force a portion of the container into the at least one orifice of the plurality of enclosure orifices, thereby stressing and rupturing the portion of the container in the at least one orifice.

30. The inflator of claim 29 wherein the mechanism for producing rupture of the container further comprises a propellant provided within the bladder for generation of combustion gases upon ignition of the propellant, to produce expansion of the bladder, and an ignition source for igniting the propellant.

31. The inflator of claim 30 wherein the ignition source comprises an electric match.

32. A vehicle occupant restraint system comprising:
a safety belt assembly including a safety belt housing and a safety belt extending from the safety belt housing, and an airbag system comprising at least one airbag and an airbag inflator including:
a housing having an interior and a plurality of orifices formed therealong to enable fluid communication between an interior of the housing and an exterior of the housing;
an amount of a gas source material positioned in the interior of the housing, the gas source material being adapted to undergo decomposition to form decomposition products including at least one gaseous decomposition product comprising an inflation gas;
an amount of a reactant material positioned in the interior of the housing in fluid isolation from the gas source material the reactant material being adapted to react with the gas source material to produce decomposition of the gas source material including the at least one gaseous decomposition product, a first one of the gas source material and the reactant material being enclosed in a pliable, substantially rupturable gas-and-moisture-impermeable container, the other one of the gas source material and the reactant material being positioned to communicate with the first one of the gas source material and the reactant material upon rupture of the rupturable container; and
a mechanism for producing rupture of the container to enable fluid communication between the gas source material and the reactant material;

an enclosure positioned within the housing to form a cavity between an outer wall of the housing and the enclosure, the enclosure having an interior and a plurality of orifices formed therealong to enable fluid communication between the interior of the enclosure and the interior of the housing, and wherein the container is positioned in the interior of the enclosure; and wherein the mechanism for producing rupture of the container forces a portion of the container into at least one orifice of the plurality of enclosure orifices, thereby stressing and rupturing the portion of the container in the at least one orifice and releasing contents of the container to flow through the orifice into the interior of the housing.

33. The inflator of claim 32 wherein the mechanism for producing rupture of the container includes a resilient, expandable bladder positioned in the interior of the enclosure in communication with the container such that, upon expansion, the bladder contacts the container to force a portion of the container into the at least one orifice of the plurality of enclosure orifices, thereby stressing and rupturing the portion of the container in the at least one orifice.

34. The inflator of claim 33 wherein the mechanism for producing rupture of the container further comprises a propellant provided within the bladder for generation of combustion gases upon ignition of the propellant, to produce expansion of the bladder, and an ignition source for igniting the propellant.

35. The inflator of claim 34 wherein the ignition source comprises an electric match.

36. A method for generating inflation gas for a vehicle occupant restraint system, comprising the steps of:
providing a housing having an interior and a plurality of orifices formed therealong to enable fluid communication between an interior of the housing and an exterior of the housing;
positioning an amount of a gas source material in the interior of the housing, the gas source material being adapted to undergo decomposition to form decomposition products including at least one gaseous decomposition product comprising an inflation gas;
positioning an amount of a reactant material in the interior of the housing in fluid isolation from the gas source material, the reactant material being adapted to react with the gas source material to produce decomposition of the gas source material including the at least one gaseous decomposition product, a first one of the gas source material and the reactant material being enclosed in a pliable, substantially rupturable gas-and-moisture-impermeable container, the other one of the gas source material and the reactant material being positioned to communicate with the first one of the gas source material and the reactant material upon rupture of the rupturable container;
providing a mechanism for rupturing the container to enable fluid communication between the gas source material in the container and the reactant material; and
rupturing the container to provide fluid communication between the gas source material and the reactant material, thereby producing decomposition of the gas source material and formation of an inflation gas;
providing an enclosure positioned within the housing to form a cavity between an outer wall of the housing and the enclosure, the enclosure having an interior and a plurality of orifices formed therealong to enable fluid communication between the interior of the enclosure and the cavity; and positioning the container in the interior of the enclosure; and wherein the step of providing a mechanism for rupturing the container comprises providing a mechanism for forcing a portion of the container into at least orifice of the plurality of enclosure orifices, thereby stressing and rupturing the portion of the container in the at least one orifice and releasing contents of the container to flow through the orifice into the interior of the housing.

37. The method of claim 36 wherein the step of providing an amount of a gas source material comprises providing an amount of gas source material sufficient to generate the inflation gas at a rate sufficient to inflate, at a predetermined inflation rate, an inflatable element of a vehicle occupant restraint system having a predetermined volume, upon reaction with the reactant composition.

38. The method of claim 36 wherein the step of providing an amount of a gas source material comprises providing an amount of liquid hydrogen peroxide.

39. The method of claim 36 wherein the step of providing an amount of a reactant material comprises providing a catalyst selected from the group consisting of manganate and cupric oxide; silver; manganate; potassium permanganate; potassium permanganate and alumina beads; and mixtures thereof.

40. The method of claim 36 further comprising the step of providing a filter positioned intermediate the interior of the housing and the plurality of housing orifices for filtering the inflation gas.

41. The method of claim 36 wherein the step of providing a mechanism for forcing a portion of the container into at least one orifice of the plurality of enclosure orifices comprises providing a resilient, expandable bladder positioned in the interior of the enclosure in communication with the container, and wherein the step of rupturing the container comprises the step of expanding the bladder so as to press against the container and force a portion of the container into the at least one orifice of the plurality of enclosure orifices, thereby stressing and rupturing the portion of the container in the at least one orifice.

42. The method of claim 41 wherein the step of providing a mechanism for forcing a portion of the container into at least one orifice of the plurality of enclosure orifices further comprises the steps:

providing a propellant within the bladder for generation of combustion gases upon ignition of the propellant, to produce expansion of the bladder, and providing an ignition source for igniting the propellant, wherein the step of rupturing the container comprises the step of igniting the propellant to generate expending combustion gases, thereby producing expansion of the bladder.

43. The method of claim 41 wherein the step of providing a mechanism for forcing a portion of the container into at least one orifice of the plurality of enclosure orifices further comprises the step of providing a source of compressed fluid operatively coupled to the bladder for providing an expandable fluid to the bladder to expand the bladder upon activation of the inflator and wherein the step of rupturing the container comprises enabling fluid communication between the source of compressed fluid and the bladder to expand the bladder.

44. An inflator comprising:
a housing having an interior and a plurality of orifices formed therealong to enable fluid communication between the interior of the housing and an exterior of die housing;

an amount of a gas source material positioned in the interior of the housing, the gas source material being formulated to undergo decomposition to form decomposition products including at least one gaseous decomposition product comprising an inflation gas;

an amount of a reactant material positioned in the interior of the housing in fluid isolation from the gas source material, the reactant material being selected to react with the gas source material to produce decomposition of the gas source material including the at least one gaseous decomposition product, one of the gas source material and the reactant material being contained in a substantially rupturable container; and a mechanism for producing rupture of the container to enable fluid communication between the gas source material and the reactant material.

45. An airbag system comprising:
at least one airbag; and
an inflator including:
a housing having an interior and a plurality of orifices formed therealong to enable fluid communication between an interior of the housing and an exterior of the housing;

an amount of a gas source material positioned in the interior of the housing, the gas source material being adapted to undergo decomposition to form decomposition products including at least one gaseous decomposition product comprising an inflation gas;

an amount of a reactant material positioned in the interior of the housing in fluid isolation from the gas source material, the reactant material being adapted to react with the gas source material to produce decomposition of the gas source material including the at least one gaseous decomposition product, a first one of the gas source material and the reactant material being enclosed in a rupturable container, the other one of the gas source material and the reactant material being positioned to communicate with the first one of the gas source material and the reactant material upon rupture of the rupturable container; and a mechanism for producing rupture of the container to enable fluid communication between the gas source material and the reactant material.

46. A vehicle occupant restraint system comprising:
a safety belt assembly including a safety belt housing and a safety belt extending from the safety belt housing, and an airbag system comprising at least one airbag and an airbag inflator including:

a housing having an interior and a plurality of orifices formed therealong to enable fluid communication between an interior of the housing and an exterior of the housing;

an amount of a gas source material positioned in the interior of the housing, the gas source material being adapted to undergo decomposition to form decomposition products including at least one gaseous decomposition product comprising an inflation gas;

an amount of a reactant material positioned in the interior of the housing in fluid isolation from the gas source material the reactant material being adapted to react with the gas source material to produce decomposition of the gas source material including the at least one gaseous decomposition product, a first one of the gas source material and the reactant material being enclosed in a pliable, substantially rupturable gas-and-moisture-impermeable container, the other one of the gas source material and the reactant material being positioned to communicate with the first one of the gas source material and the reactant material upon rupture of the rupturable container; and a mechanism for producing rupture of the container to enable fluid communication between the gas source material and the reactant material.

47. A method for generating inflation gas for a vehicle occupant restraint system, comprising the steps of:

providing a housing having an interior and a plurality of orifices formed therealong to enable fluid communication between an interior of the housing and an exterior of the housing;

positioning an amount of a gas source material in the interior of the housing, the gas source material being adapted to undergo decomposition to form decomposition products including at least one gaseous decomposition product comprising an inflation gas;

positioning an amount of a reactant material in the interior of the housing in fluid isolation from the gas source material, the reactant material being adapted to react with the gas source material to produce decomposition of the gas source material including the at least one gaseous decomposition product, a first one of the gas source material and the reactant material being enclosed in a pliable, substantially rupturable gas-and-moisture-impermeable container, the other one of the gas source material and the reactant material being positioned to communicate with the first one of the gas source material and the reactant material upon rupture of the rupturable container;

providing a mechanism for rupturing the container to enable fluid communication between the gas source material in the container and the reactant material; and rupturing the container to provide fluid communication between the gas source material and the reactant material, thereby producing decomposition of the gas source material and formation of an inflation gas.

* * * * *